Feb. 27, 1962  L. B. CONNER, JR  3,023,361
RADIOMETER SPEED MEASURING SYSTEM
Filed May 12, 1960  2 Sheets-Sheet 1

INVENTOR.
BY Leo B. Conner, Jr.
Paul J. Ethington
ATTORNEY

Feb. 27, 1962 L. B. CONNER, JR 3,023,361
RADIOMETER SPEED MEASURING SYSTEM
Filed May 12, 1960 2 Sheets-Sheet 2

INVENTOR.
BY Leo B. Conner, Jr.
Paul J. Ethington
ATTORNEY

United States Patent Office 3,023,361
Patented Feb. 27, 1962

3,023,361
RADIOMETER SPEED MEASURING SYSTEM
Leo B. Conner, Jr., Phoenix, Ariz., assignor to General Motors Corporation, Detroit, Mich., a corporation of Delaware
Filed May 12, 1960, Ser. No. 28,717
5 Claims. (Cl. 324—70)

This invention relates to speed measuring systems and more particularly to a radiometer system for measuring the speed of a vehicle.

It is a principal object of this invention to provide a system for measuring the ground speed of a vehicle, such as an aircraft, by aircraft carried equipment which does not depend upon inertial sensing instruments or require radiation of energy from the aircraft. In accordance with this invention, this is accomplished by means of a radiometer receiver having an antenna field pattern adapted to scan the ground in a known direction relative to the aircraft axes so that the spectral density of the received signal is modified at the scan frequency. With a fore and aft scan, the spectral density during the forward scan is less than that during the rearward scan in accordance with the ground speed of the aircraft along its true heading, and means are provided to develop a signal corresponding to this difference in spectral density as a measure of speed.

A more complete understanding of this invention may be had from the detailed description which follows taken with the accompanying drawings in which.

Figure 1:
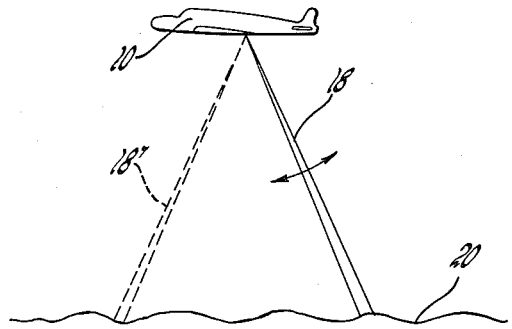
FIGURE 1 shows a field pattern from a scanning antenna on an aircraft.
Figure 2:
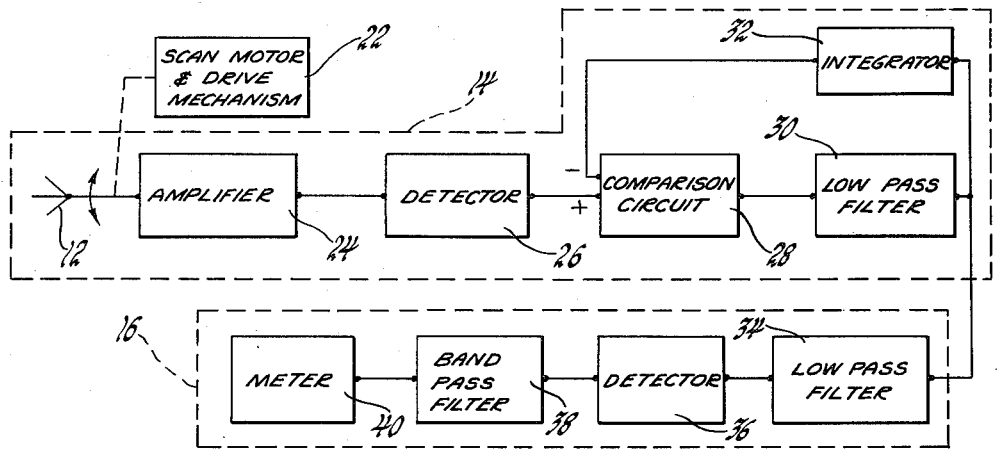
FIGURE 2 is a block diagram of the speed measuring system.

Referring now to the drawings, there is shown an illustrative embodiment of the invention in a speed measuring system for aircraft utilizing a microwave radiometer receiver. The speed measuring system is adapted for installation in an aircraft 10, and in general, comprises a scanning antenna 12 of a radiometer receiver 14, and a spectral density responsive means 16 for developing a signal corresponding to the aircraft speed. The field pattern 18 of the antenna 12 is relatively narrow in angular coverage and is adapted to scan the ground 20 fore and aft of the aircraft to measure its ground speed in the direction of its longitudinal axis, or true heading. The field pattern 18 is illustrated in solid lines at the limit of its rearward scan and the field pattern 18' represents the limit of the forward scan. An identical system may be provided to measure ground speed in the direction of the transverse aircraft axis by means of an antenna adapted to scan transversely and the information from the two systems may be combined to obtain ground speed in the direction of the ground track. The additional system is not described herein, however, since a complete understanding of the invention will be obtained from a description of the system with a fore and aft antenna scan.

The field pattern is caused to execute the oscillatory scanning motion by any suitable means such as a scan motor and drive mechanism 22 which is mechanically connected to the antenna 12. The frequency of the scanning motion, as will appear more fully hereinafter, should be high enough so that the linear speed of the field pattern intercept on the ground is appreciably higher than the highest expected speed of the aircraft.

The radiometer receiver 14, including the antenna 12, is adapted to develop a signal corresponding to the variation of the thermal radiation within the field pattern of the antenna. Although radiometer receivers are known per se it will be helpful to consider briefly the general principles of operation and the general configuration of an illustrative embodiment. The receiver shown in the illustrative embodiment is disclosed and claimed in copending patent application S.N. 745,760, filed June 30, 1958, by Theodore V. Seling for "Microwave Radiometer System" and assigned to the assignee of this application.

It is well known that all physical objects radiate electromagnetic energy throughout the entire frequency spectrum and the majority of the energy is concentrated in the infrared portion of the spectrum but a useable level of energy is radiated at the microwave frequencies. The power radiated at a given frequency for an ideal black body radiator is primarily a function of the absolute temperature of the radiating body but for ordinary bodies, it is primarily a function of the body's radiation efficiency. The electromagnetic energy radiated from a body is conveniently referred to as thermal radiation, regardless of the portion of the spectrum involved, and the amount of energy is commonly measured in terms of "apparent temperature." It is possible with a highly directive receiving system by scanning the background and measuring the changes in radiated energy to detect the presence of objects or targets in a background, such as the earth's surface, when the objects have a radiating efficiency or apparent temperature different from that of the background. A signal voltage is developed corresponding to the apparent temperature of the objects or targets and to a certain extent the objects may be distinguished from each other.

In the radiometer receiver, the antenna 12 is connected to the input of an amplifier 24. The thermal radiation intercepted by the antenna is characterized by a very wide frequency spectrum and a random phase relation among the various frequency components. A signal will be developed by the antenna corresponding to the total received power which may be considered as the summation of the power radiated from the background area plus the change in power caused by the interception of an object having a radiation efficiency differing from that of the background area. The amplifier has a relatively broad band response and suitably takes the form of a traveling wave tube or other amplifying device capable of amplification with high signal-to-noise ratio at microwave frequencies. The amplifier 24 inherently generates a noise power which may be regarded as part of the background power and is added to the received power in the output of the amplifier. The output of the amplifier is applied to a detector 26 which is suitably a square-law detector. Since the output voltage from the amplifier is characterized by the superposition of a large number of alternating components, in random phase relation, the output voltage from the detector will be a direct voltage component with superimposed alternating voltage components, both of which are proportional to input power.

In order to detect the presence of an object in the field pattern of the antenna, means are provided to develop a signal corresponding to the changes in received power. This is accomplished by a modulator arrangement wherein the background power is subtracted from the output of the detector to leave a signal voltage corresponding to change in radiated power caused by the intercepted object. The output voltage of the detector 26 is applied, with the relative polarity indicated, to one input terminal of a comparison circuit 28. This voltage includes a direct component corresponding to the sum of the background power and the change of received power caused by the interception of an object and also includes an alternating component which is considered to be a noise voltage. The output voltage of the comparison circuit is applied to the input of a low-pass filter 30 which has a sufficiently long time constant to remove the noise voltage component. The output voltage from the low-pass filter is fed back through an integrator 32 to another input terminal of the comparison circuit 28, with the relative polarity indicated. The integrator 32 has a sufficiently long time constant so that changes in the direct component of the detector voltage corresponding to the interception of objects by the antenna are removed. Thus the output voltage of the integrator 32 corresponds to the time average value of the direct component of the detector voltage arising from the background power. The output voltage of the integrator 32 is equal in amplitude and opposite in polarity to the output voltage of the detector in the absence of any objects intercepted by the antenna. The signal voltage output, derived from the output of the low-pass filter 30, therefore corresponds to changes in received power due to the occurrence of objects intercepted by the antenna field pattern.

Figure 3:
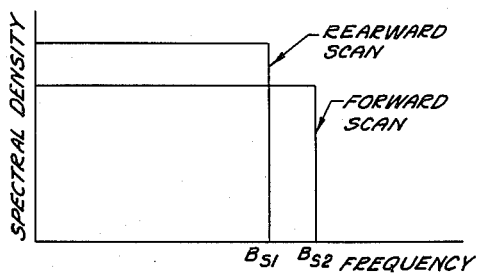
FIGURE 3 is a graphical representation of spectral density for the rearward scan and forward scan of the antenna field pattern.
Figure 5:
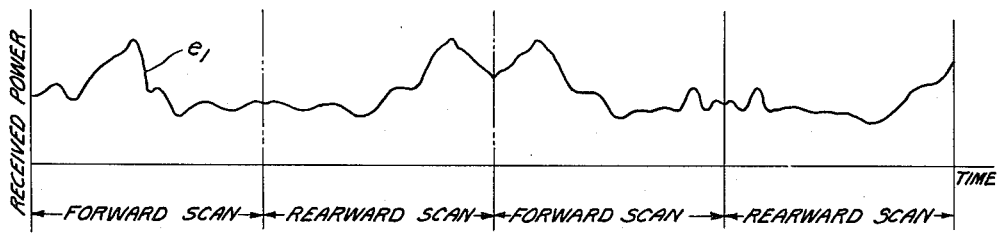
FIGURES 5, 5a, 5b and 5c are graphical representations of the waveforms developed in the speed measuring system.

Before proceeding with the description of the remainder of the system, it will be helpful to consider the effect of the oscillatory scanning motion of the antenna field pattern upon the character of the detector signal. The rate at which the antenna beam pattern scans the ground, due to the oscillatory motion, is modified by the motion of the aircraft. On the forward scan, the rate of scanning is increased by the aircraft speed while on the rearward scan the rate is decreased by the aircraft speed. The time period of the forward scan is the same as the time period of the rearward scan so the total energy received by the antenna is approximately the same in both directions. However, since there is a difference in ground scanning rates caused by the aircraft speed, the spectral density of the received signal on the rearward scan is greater than the spectral density of the received signal on the forward scan. This relationship is illustrated in FIGURE 5 which shows the signal voltage waveform $e_1$ at the output of the detector 26 corresponding to the variations of received power due to the interception of objects by the field pattern of the antenna. For purposes of explanation and clarity, the amplitude variations of the signal voltage $e_1$ is greatly exaggerated and the scanning frequency with respect to the signal frequency is also greatly exaggerated. The waveform of the signal voltage shows that the objects encountered by the antenna during the forward scan are encountered in reverse order and at a lower scanning rate during the rearward scan. Thus, the same objects produce a signal spectrum of greater bandwidth during the forward scan than during the rearward scan. This relationship is also illustrated by a plot of spectral density in FIGURE 3 which shows the signal spectrum during the rearward scan with a bandwidth $B_{s1}$ and the signal spectrum for the forward scan with a bandwidth $B_{s2}$. When the detector output voltage is applied through the comparison circuit 28 and the low-pass filter 30, the high frequency, noise voltage component of the detector output is removed. The integrator develops a direct voltage corresponding to the background power which is subtracted from the detector output voltage in the comparison circuit 28. Therefore, the output of the low-pass filter 30 is a signal voltage of substantially the same waveform as $e_1$, but the high frequency noise and part of the direct current component is removed.

Figure 4:
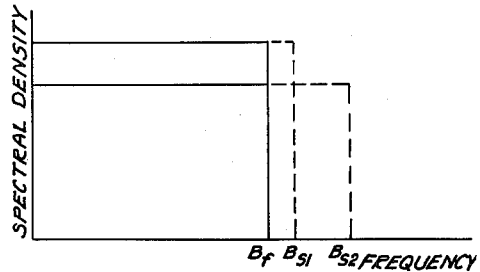
FIGURE 4 is a graphical representation of spectral density modified by a low-pass filter.
Figure 5A:
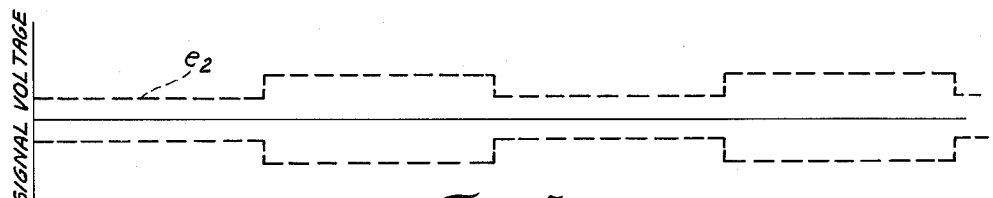
Figure 5B:
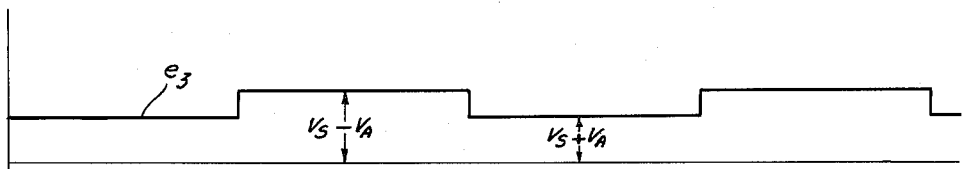

In order to obtain a measure of vehicle speed from the output of the radiometer receiver, means are provided to detect, the extent of change in spectral density of the signal between forward and rearward scan. For this purpose, there is proivded a low-pass filter 34 with a bandpass $B_f$ which is less than the bandwidth of either signal spectrum and thus removes the high frequency components of the signals. Consequently, the difference in bandwidth of the signal voltage during forward and rearward scans is eliminated but the difference in amplitude is retained, as shown in FIGURE 4. This difference in amplitude is also illustrated in FIGURE 5a wherein the average value of the signal voltage envelope is shown as a waveform $e_2$. In order to remove the negative half cycles, the output of the low-pass filter is applied to a detector 36 which rectifies the signal voltage to develop a direct signal voltage having a waveform $e_3$ as illustrated in FIGURE 5b. The amplitude of the waveform $e_3$ during the forward scan corresponds to the scan speed $V_s$ plus aircraft speed $V_a$ and the average value during the rearward scan corresponds to the scan speed $V_s$ minus the aircraft speed $V_a$.

Figure 5C:
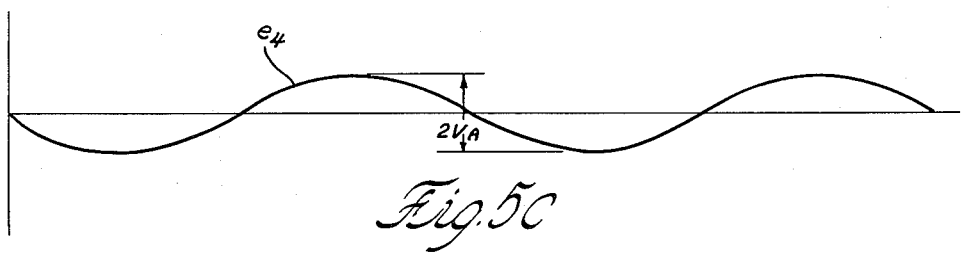

In order to obtain aircraft speed $V_a$, the output of the detector 36 is applied to a bandpass filter 38. The bandpass filter has a center frequency equal to the scan frequency and accordingly, the output thereof has a waveform $e_4$, as shown in FIGURE 5c, and includes a fundamental component at the scan frequency with a peak-to-peak amplitude corresponding to two times the aircraft speed. This velocity information is presented on indicating means 40 which takes the form of a voltmeter appropriately calibrated in terms of aircraft speed.

Although the description of this invention has been given wtih respect to a particular embodiment, it is not to be construed in a limiting sense. Numerous variations and modifications within the spirit and scope of the invention will now occur to those skilled in the art. For a definition of the invention, reference is made to the appended claims.

I claim:

1. A speed measuring system for vehicles comprising a radiometer receiver including an antenna and scanning means connected with the antenna for causing the antenna field pattern to intercept the ground with oscillatory scanning motion having a component in the direction of vehicle motion, said receiver being adapted to develop a signal corresponding to the variation of the received power about the average value of received power, the spectral density of said signal during the forward scan of the antenna beam pattern being less than the spectral density thereof during the rearward scan in accordance with the speed of the vehicle, and means connected with said receiver for developing a signal corresponding to the difference in the spectral density of the received signal during forward and rearward scan as a measure of vehicle speed.

2. A speed measuring system for vehicles comprising a radiometer receiver including an antenna and scanning means connected with the antenna for causing the antenna field pattern to intercept the ground with oscillatory scanning motion having a component in the direction of vehicle motion, said receiver being adapted to develop a signal corresponding to the variation of the received power about the average value of received power, the spectral density of said signal during the forward scan of the antenna beam pattern being less than the spectral density thereof during the rearward scan in accordance with the speed of the vehicle, and means connected with said receiver to remove the high frequency components of the signal so that the bandwidth thereof is the same during forward and rearward scan, and means connected to the last-mentioned means for developing a signal corresponding to the amplitude variations in the signal at the frequency of said oscillatory scanning motion.

3. A speed measuring system for vehicles comprising a radiometer receiver including an antenna and scanning means connected with the antenna for causing the antenna field pattern to intercept the ground with oscillatory scanning motion having a component in the direction of vehicle motion, said receiver being adapted to develop a signal corresponding to the variation of the received power about the average value of received power, the spectral density of said signal during the forward scan of the antenna beam pattern being less than the spectral density thereof during the rearward scan in accordance with the speed of the vehicle, a low-pass filter connected with said receiver to remove the high frequency components of the signal so that the bandwidth thereof is the same during forward and rearward scan, and means connected to said filter for developing a signal corresponding to the amplitude variations in the signal at the frequency of said oscillatory scanning motion.

4. A speed measuring system for vehicles comprising a radiometer receiver including an antenna and scanning means connected with the antenna for causing the antenna field pattern to intercept the ground with oscillatory scanning motion having a component in the direction of vehicle motion, said receiver being adapted to develop a signal corresponding to the variation of the received power about the average value of received power, the spectral density of said signal during the forward scan of the antenna beam pattern being less than the spectral density thereof during the rearward scan in accordance with the speed of the vehicle, and filter means connected with said receiver for limiting the bandwidth of the signal so that it is the same during forward and rearward scan, and means including a detector and frequency selective means connected to the filter means for developing a signal corresponding to the amplitude variations in the signal at the frequency of said oscillatory scanning motion.

5. A speed measuring system for vehicles comprising a radiometer receiver including an antenna and scanning means connected with the antenna for causing the antenna field pattern to intercept the ground with oscillatory scanning motion having a component in the direction of vehicle motion, said receiver being adapted to develop a signal corresponding to the variation of the received power about the average value of received power, the spectral density of said signal during the forward scan of the antenna beam pattern being less than the spectral density thereof during the rearward scan in accordance with the speed of the vehicle, a low-pass filter connected with said receiver to remove the high frequency components of the signal so it has the same bandwidth during forward and backward scan, a detector connected with the low-pass filter to rectify the signal, and a bandpass filter connected with the detector and having a center frequency equal to the frequency of the oscillatory scanning motion to develop an alternating signal having an amplitude corresponding to vehicle speed.

References Cited in the file of this patent
UNITED STATES PATENTS 2,458,654     Southworth _____ Jan. 11, 1949

OTHER REFERENCES

Electronics, August 1, 1957, pp. 7 and 8.